(12) United States Patent
Milner (10) Patent No.: US 7,394,834 B2
(45) Date of Patent: Jul. 1, 2008

(54) COMMON INTERFACE CONTROLLER AND METHOD OF DESCRAMBLING TRANSPORT STREAM CHANNELS

(75) Inventor: Jonathan Richard Milner, Berkshire (GB)

(73) Assignee: Sony United Kingdom Limited, Weybridge (GB)

( * ) Notice: Subject to any disclaimer, the term of this patent is extended or adjusted under 35 U.S.C. 154(b) by 840 days.

(21) Appl. No.: 10/807,854

(22) Filed: Mar. 24, 2004

(65) Prior Publication Data

US 2004/0252833 A1 Dec. 16, 2004

(30) Foreign Application Priority Data

Mar. 26, 2003 (GB) ................................ 0306958.0

(51) Int. Cl.
*H04J 3/04* (2006.01)
(52) U.S. Cl. .................... 370/535; 370/537; 375/257; 380/200; 380/212; 380/227; 725/6; 725/31
(58) Field of Classification Search ................ 370/321, 370/419, 503, 535, 537; 380/227, 200, 212; 725/6, 31; 375/257
See application file for complete search history.

(56) References Cited

U.S. PATENT DOCUMENTS

| 5,838,873 | A | * | 11/1998 | Blatter et al. | 386/95 |
| 5,844,595 | A | * | 12/1998 | Blatter et al. | 455/83 |
| 5,852,290 | A | * | 12/1998 | Chaney | 235/492 |
| 5,920,572 | A | * | 7/1999 | Washington et al. | 370/535 |
| 6,035,037 | A | * | 3/2000 | Chaney | 380/227 |
| 6,195,368 | B1 | * | 2/2001 | Gratacap | 370/535 |
| 6,219,358 | B1 | * | 4/2001 | Pinder et al. | 370/537 |
| 6,246,701 | B1 | * | 6/2001 | Slattery | 370/503 |
| 6,421,359 | B1 | * | 7/2002 | Bennett et al. | 370/538 |
| 2003/0002141 | A1 | | 1/2003 | Candelore et al. | |
| 2003/0031211 | A1 | | 2/2003 | Leyendecker | |
| 2003/0110382 | A1 | * | 6/2003 | Leporini et al. | 713/172 |
| 2003/0123657 | A1 | | 7/2003 | Bjordammen et al. | |
| 2005/0105486 | A1 | * | 5/2005 | Robinett et al. | 370/321 |
| 2005/0262537 | A1 | * | 11/2005 | Baran et al. | 725/88 |
| 2006/0136976 | A1 | * | 6/2006 | Coupe et al. | 725/131 |
| 2006/0269060 | A1 | * | 11/2006 | Candelore et al. | 380/239 |

FOREIGN PATENT DOCUMENTS

| GB | 2 315 649 | 2/1998 |
| GB | 2 355 618 | 4/2001 |
| WO | WO 01/37562 | 5/2001 |
| WO | WO 02/41625 | 5/2002 |

* cited by examiner

*Primary Examiner*—Melvin Marcelo
*Assistant Examiner*—Riyami Abdullah
(74) *Attorney, Agent, or Firm*—Oblon, Spivak, McClelland, Maier & Neustadt, P.C.

(57) ABSTRACT

A common interface controller and a method of descrambling channels of first and second transport streams using a conditional access module for descrambling channels of a transport stream as identified by respective PIDs wherein an intermediate data stream is provided by time multiplexing at least a part of the first transport stream with at least a part of the second transport stream, the part of the first transport stream including a first channel and the part of the second transport stream including a second channel, and wherein the original value of a PID identifying the second channel is changed to an intermediate value not used by any PID of any respective channel in said at least a part of the first transport stream such that the intermediate data stream forms an intermediate transport stream for processing by the conditional access module.

18 Claims, 7 Drawing Sheets

COMMON INTERFACE CONTROLLER AND METHOD OF DESCRAMBLING TRANSPORT STREAM CHANNELS

BACKGROUND OF THE INVENTION

1. Field of the Invention

The present invention relates to a common interface controller, in particular for use in a digital television device such as a receiver, and a method of descrambling transport stream channels, in particular descrambling channels of first and second transport streams using a conditional access module.

2. Description of the Related Art

It is known to provide a digital television receiver having a connector for an external conditional access module allowing the conditional access module to be selectively attached and detached. This allows a consumer to purchase a digital receiver which is not tied to a particular service provider and then to attach a conditional access module as appropriate.

Digital television receivers are provided with a tuner to obtain the transport stream in which a desired channel is found. An example of a channel is a television programme, such as BBC 1, possibly together with its associated teletext or such like. The transport stream is then passed to the conditional access module so as to allow the desired channel to be descrambled.

It is also possible to provide a digital television receiver with two or more tuners for obtaining respective transport streams. This allows more than one channel to be used simultaneously, for instance allowing the recording of one channel whilst watching another or providing picture-in-picture display. Although many conditional access modules are capable of descrambling more than one channel simultaneously, these conditional access modules generally process only one transport stream. Unfortunately, there is no guarantee that both desired channels will occur in the same transport stream. Therefore, to ensure the possibility of descrambling two channels, it is necessary to provide a digital television receiver with two of the conditional access modules, each for processing a respective transport stream.

The need for two conditional access modules and the additional costs involved are clearly undesirable.

U.S. 2002/0101991 A1 proposes a system in which two transport streams are multiplexed together and provided to a single conditional access module. However, the conditional access module itself must be non-standard in order to deal with two transport streams. Furthermore, the connector and interface must allow additional information to be sent from the receiver to the conditional access module so as to indicate to which of the transport streams each respective packet of data belongs.

OBJECTS OF THE INVENTION

It is an object of the present invention to provide a system allowing descrambling of two or more arbitrary channels without the need for non-standard conditional access modules.

SUMMARY OF THE INVENTION

According to the present invention, there is provided a method of descrambling channels of first and second transport streams using a conditional access module for descrambling channels of a transport stream as identified by respective PIDs. The method includes providing an intermediate data stream by time multiplexing at least a part of the first transport stream with at least a part of the second transport stream, the part of the first transport stream including a first channel and the part of the second transport stream including a second channel; and changing the original value of one or more PIDs identifying the second channel to an intermediate value not used by any PID of said at least a part of the first transport stream such that the intermediate data stream forms an intermediate transport stream for processing by the conditional access module.

According to the present invention, there is provided a common interface controller for use in a digital television device having a connector for a selectively attachable conditional access module for descrambling channels of a transport stream as identified by respective PIDs. The common interface controller includes a first input interface for a first transport stream having a first channel identifiable by one or more first PIDs; a conditional access interface for transmitting to a conditional access module transport streams having scrambled channels and for receiving from the conditional access module transport streams having descrambled channels; wherein the common interface controller further includes a second input interface for a second transport stream having a second channel identifiable by one or more second PIDs; a forward multiplexer for providing an intermediate data stream by time multiplexing at least a part of the first transport stream with at least a part of the second transport stream, the part of the first transport stream including the first channel and the part of the second transport stream including the second channel; and a PID remapper for changing the original values of the second PIDs to intermediate values not used by any PID of said at least a part of the first transport stream such that said intermediate data stream forms an intermediate transport stream, the conditional access interface being arranged to transmit the intermediate transport stream to a conditional access module for descrambling of at least the first channel and the second channel.

In this way, two input transport streams may be multiplexed together to form a single transport stream which may be processed by the conditional access module. Importantly, by using the PID remapper, the data stream sent to the conditional access module is a single transport stream with the packets of the various channels uniquely identified. This is in contrast to earlier arrangements in which two transport streams are multiplexed together for transmission to a conditional access module, but are maintained as separate transport streams.

The conditional access module could be a standard Conditional Access Module (CAM) with no particular knowledge that the transport stream it receives was derived from two separate transport streams. Similarly, the conditional access module could be a Point of Deploymemt (POD) module.

The forward multiplexer could multiplex the entire contents of the first transport stream with the second transport stream. However, bandwidth can be saved if only relevant parts of the transport streams are multiplexed together. In particular, it is only necessary to multiplex the packets of any desired channels, together with the appropriate Table Information.

Preferably, the PID remapper is arranged to change the original values of each PID of the channels in said at least a part of the second transport stream to a respective intermediate values not used by any PID of said at least part of the first transport stream.

The PID remapper may apply the remapping selectively according to whether or not PIDs of one transport stream clash with the PIDs of the other transport stream. Alternatively, the PID remapper could automatically remap all PID values of one transport stream irrespective of whether or not there are any clashes. Indeed, it would also be possible to remap PIDs from both the first and second transport streams so as to provide an entirely new set of values for the intermediate values.

Preferably, the common interface controller further includes a return demultiplexer for receiving from the conditional access interface the intermediate transport stream descrambled by a conditional access module and separating said at least a part of the first transport stream from said at least a part of the second transport stream.

In this way, the common interface controller can reform two transport streams and provide them back to the digital television receiver.

Preferably, the common interface controller further includes a PID demapper for changing the intermediate values of the one or more second PIDs, as received by the conditional access interface from a conditional access module, back to their original values.

In this way, the resulting second transport stream can be identified and processed using the table information received with the original transport stream.

Preferably, the PID demapper is arranged to change the intermediate values of each PID of the channels in said at least a part of the second transport stream, as received by the conditional access interface from a conditional access module, back to the respective original values.

Thus, where the PID remapper is arranged to change the values of all of the PIDs provided to the forward multiplexer, the PID demapper changes them all back. Hence, once again, apart from the descrambled data, the transport stream can be restored to its original form.

Preferably, the common interface controller further includes a secondary return multiplexer for receiving from the return demultiplexer said at least a part of the second transport stream, as changed by the PID demapper, and for multiplexing the received at least part of a second transport stream with the remaining data of the second transport stream so as to output the second transport stream having the second channel descrambled.

In this way, the common interface controller can return the second transport stream to the digital television receiver in an identical form as to was received, other than descrambling of the data.

Preferably, the common interface controller further includes a secondary buffer for storing at least those parts of the second transport stream not forming said at least a part of the second transport stream and for use by the secondary return multiplexer.

This enables the descrambled data returned from the conditional access module to be reinserted in the correct time positions in the second transport stream.

Where the table information is provided to and returned from the conditional access module, this can be combined with the data stored in the secondary buffer. However, preferably, said at least a part of the second transport stream includes the table information for the second transport stream and the secondary buffer is arranged to store the table information for use by the secondary return multiplexer.

This avoids the possibility of any corruption by the conditional access module and makes any processing in the return path more straightforward. It simplifies the implementation of the return multiplexers since they have a smaller number of PIDs to deal with, i.e. only ES packets and not ES and TI packets.

Preferably, the common interface controller further includes a primary return multiplexer for receiving from the return demultiplexer said at least a part of the first transport stream and for multiplexing the received at least a part of the first transport stream with the remaining data of the first transport stream so as to output the first transport stream having the first channel descrambled.

Thus, as with the second transport stream, the first transport stream may be reconstructed to its original form, other than the descrambled data.

Preferably, the common interface controller further includes a primary buffer for storing at least those parts of the first transport stream not forming at least a part of the first transport stream and for use by the primary return demultiplexer.

Hence, as with the secondary buffer, the primary buffer allows synchronisation of data returned from the conditional access module.

Table information returned by the conditional access module could be used by the primary return multiplexer. However, preferably, said at least a part of the first transport stream includes the table information for the first transport stream and the primary buffer is arranged to store table information for use by the primary return multiplexer.

This has the same advantages as storing the table information for the second transport stream.

Preferably, the common interface controller further includes a primary forward demultiplexer for receiving the first transport stream from the first input interface, separating from the first transport stream said at least a part of the first transport stream and outputting said at least a part of the first transport stream to the forward multiplexer.

This allows the at least a part of the first transport stream to be only part of the first transport stream, such that the total amount of data sent to the conditional access module is reduced.

Similarly, the common interface controller preferably further includes a secondary forward demultiplexer for receiving the second transport stream from the second input interface, separating from the second input interface, said at least a part of the second transport stream and outputting said at least a part of the second transport stream.

In this way, it is possible to send to the conditional access module only the required channels of the first and second transport streams, together with the appropriate table information.

Preferably, the PID remapper is connected between the secondary forward demultiplexer and the forward multiplexer. Hence, the at least a part of the second transport stream provided by the secondary forward demultiplexer has its PIDs remapped as necessary.

Preferably, the common interface controller further includes a command interface for communication with a conditional access module.

The common interface controller according to the present invention may be embodied as part of a larger integrated circuit. Indeed, it may be embodied in a digital television device including a connector for a selectively attachable conditional access module for descrambling channels of a transport stream. The digital television device may be one of a digital television receiver, a digital TV tuner board for a personal computer and a Personal Video Recorder. The digital television device may be provided in combination with one or more conditional access modules.

BRIEF DESCRIPTION OF THE DRAWINGS

FIGS. 1(*a*) to (*d*) illustrate digital television devices embodying the present invention;

DETAILED DESCRIPTION OF THE PREFERRED EMBODIMENTS

The invention will be more clearly understood from the following description, given by way of example only, with reference to the accompanying drawings.

Figure 1A:
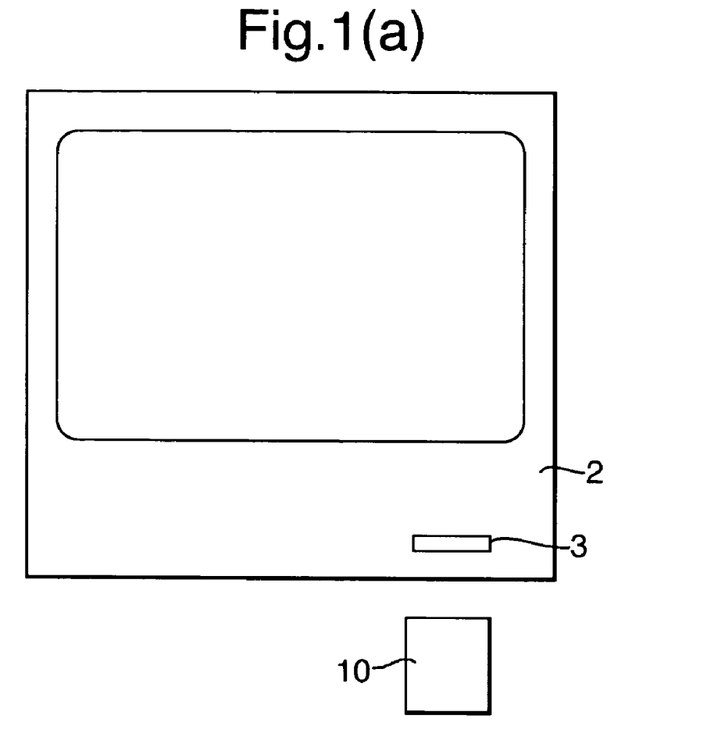
Figure 1B:
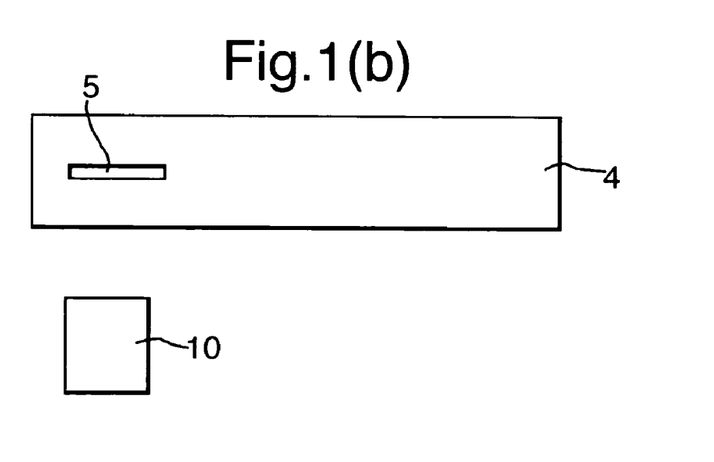
Figure 1C:
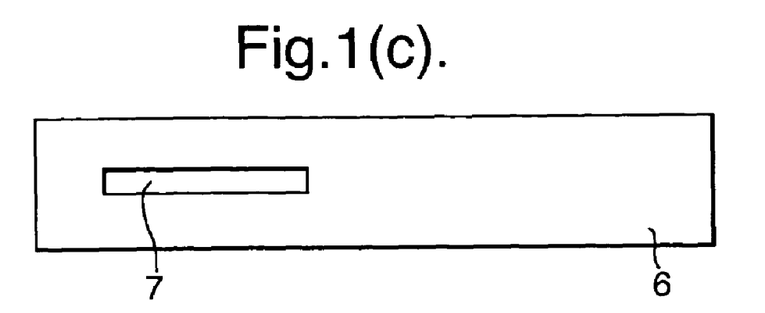
Figure 1D:
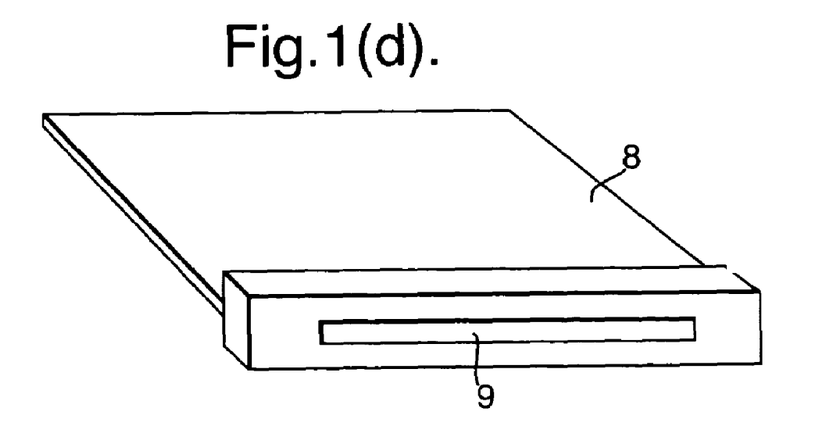

FIGS. 1(a) to (d) illustrate respectively digital television devices which may embody the present invention. In particular, FIG. 1(a) illustrates an integrated digital television 2 whereas FIG. 1(b) illustrates a set top box 4 for use with a separate television. FIG. 1(c) illustrates a personal video recorder 6 and FIG. 1(d) illustrates a board 8 for a personal computer. These units are provided with connector slots 3, 5, 7 and 9 into which a conditional access module 10 may be inserted to provide descrambling of channels in any received signal. In particular, the conditional access module 10 forms part of a Conditional Access System (CAS).

Figure 2:
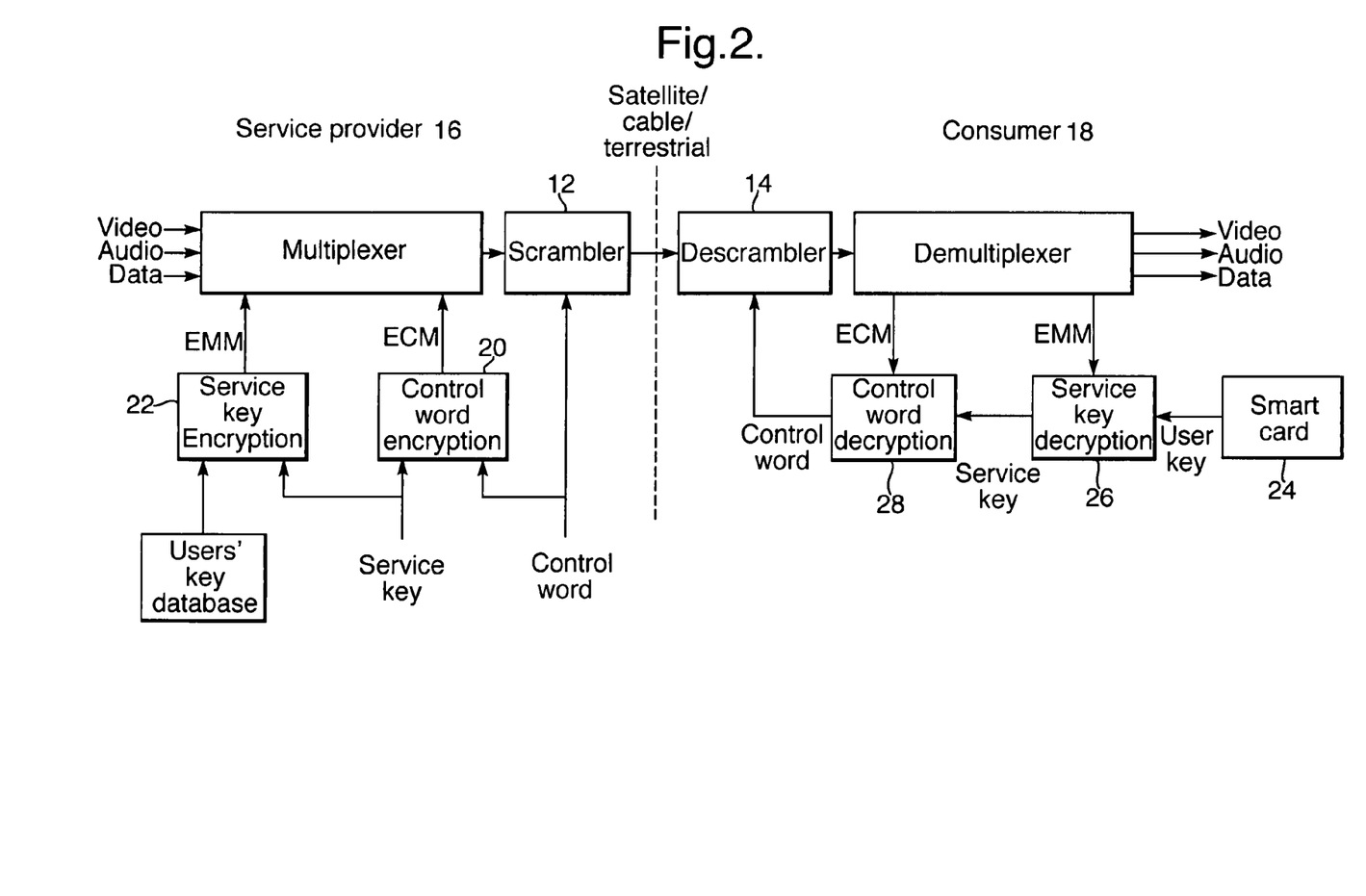
FIG. 2 illustrates the principals of a conditional access system to be used by the present invention.

In digital television transmission, it is known to provide a Conditional Access System (CAS) by which individual channels which are for broadcast may be scrambled and made available selectively to end users. FIG. 2 illustrates schematically key features of a CAS in which the present invention can be embodied.

At its most basic level, a Conditional Access System (CAS) has a mechanism to deliver broadcast services to subscribers who are authorised to receive them and to protect those services from access by anyone else. The general architecture of a CAS includes two main components, namely scrambling and encryption.

Prior to transmission, scrambling 12 is used to transform the audio and video of a program in a way that makes the resulting program distorted and unviewable. A scrambling algorithm controls this transformation. The consumer's receiver uses a corresponding descrambling algorithm to restore the program to its viewable form.

Scrambling and descrambling processes are controlled by a Control Word (CW). The descrambler 14 needs the CW used by the scrambler 12 in order to correctly descramble the program. The CW may be sent from the service provider 16 to the consumer 18 via a hierarchy of encryption. Encryption transforms each data element using a sophisticated cryptographic system.

At the service provider end, the CW is encrypted 20 with a Service Key (SK) and then sent to the consumer in the form of an Entitlement Control Message (ECM). The SK is typically common to all consumers 18 and each ECM is typically sent to all consumers 18 simultaneously (due to transmission bandwidth limitations).

The SK itself is then encrypted 22 with a User Key (UK) and sent to the consumer 18 in the form of an Entitlement Management Message (EMM). The UK is unique to each consumer 18 and each EMM is sent to an individual consumer 18.

At the consumer end, the UK is typically provided on a smart card 24. The UK is used to decrypt 26 the EMMs addressed to a specific individual consumer 18. The resulting SK is then used to decrypt 28 the ECM, providing the CW, which can finally be used in the descrambler 14.

From a cryptographic point of view, the scrambling is relatively insecure compared to the encryption. Accordingly, typically, the CW is changed with a period of the order of 1 second so as to frustrate brute force attempts to discover the CW. The SK is typically changed once per month in an attempt to prevent hackers gaining ground.

Figure 3:
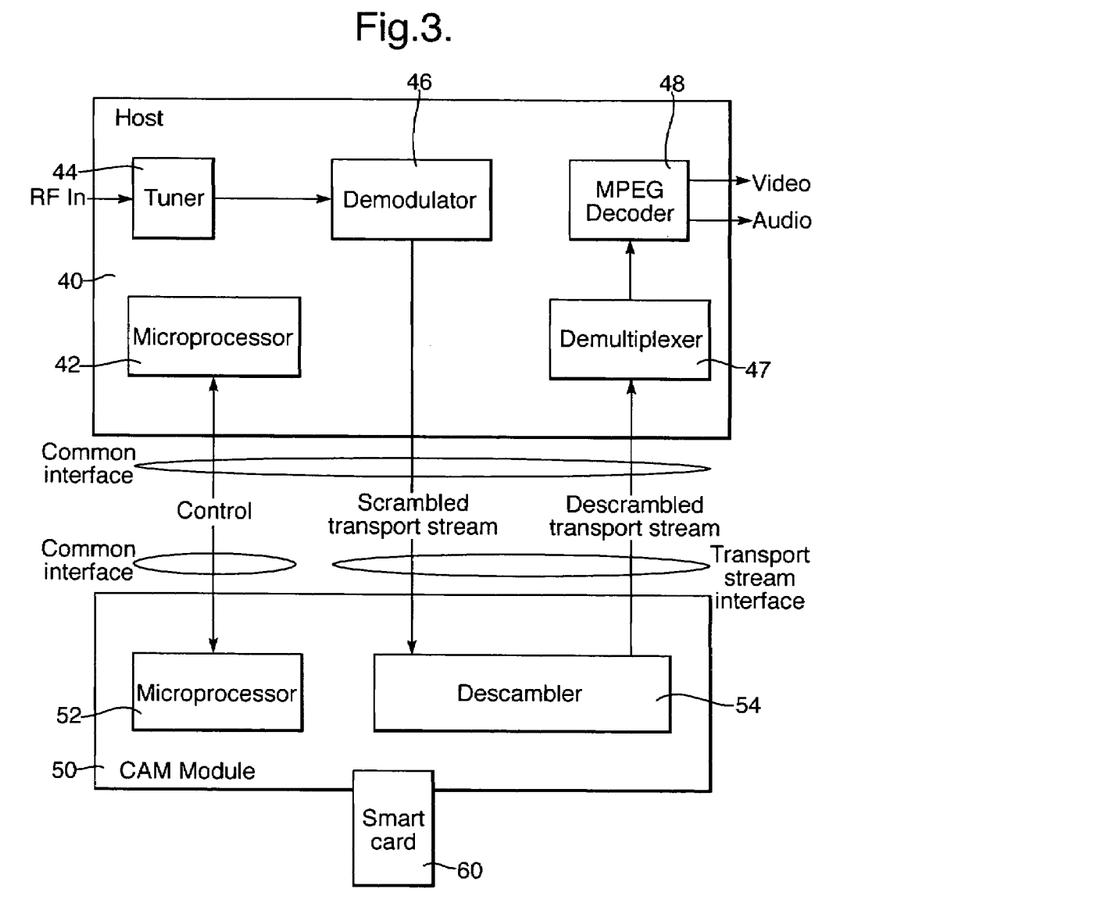
FIG. 3 illustrates schematically a digital television receiver connected to a conditional access module.

FIG. 3 illustrates schematically a digital television receiver 40 and its connections to a conditional access module 50.

The conditional access module 50 is connected to the receiver 40 by means of a Common Interface (CI). In this respect, it will be noted that DVB defines a particular common interface which takes the form of a PCMCIA (or PC card) slot into which the conditional access module can be inserted.

The Common Interface includes two logical interfaces, which share the same physical interface, namely the Command Interface and the Transport Stream Interface.

As illustrated, the Command Interface conveys control and status information between the receiver 40 and the conditional access module 50, for instance between microprocessor 42 and microprocessor 52. By way of example, this interface is used to tell the conditional access module which program the user wishes to view and, hence, which program should be descrambled.

The Transport Stream Interface carries two transport streams, namely a scrambled transport stream and an unscrambled transport stream. In particular, the receiver includes a tuner 44 and demodulator 46 which provide the scrambled transport stream for the descrambler 54 of the conditional access module 50. The descrambled transport stream is then sent from the descrambler 54 to a demultiplexer 47 and MPEG decoder 48 of the receiver 40 so as to provide the required audio and video data. As illustrated, a smart card 60, including User Key (UK) as described above, is connected to the conditional access module 50.

Although it is common to provide a receiver with a single tuner, it is desirable to use a dual tuner design. This, for example, allows a user to watch one channel whilst recording another channel. This is particularly advantageous in systems such as "Personal Video Recorder" (PVR) STBs. Personal Video Recorders may have hard disks or re-recordable optical disks as a storage medium. They may act merely as video recorders, but preferably have some intelligence allowing them to record automatically programmes according to a users previous viewing habits.

Figure 4:
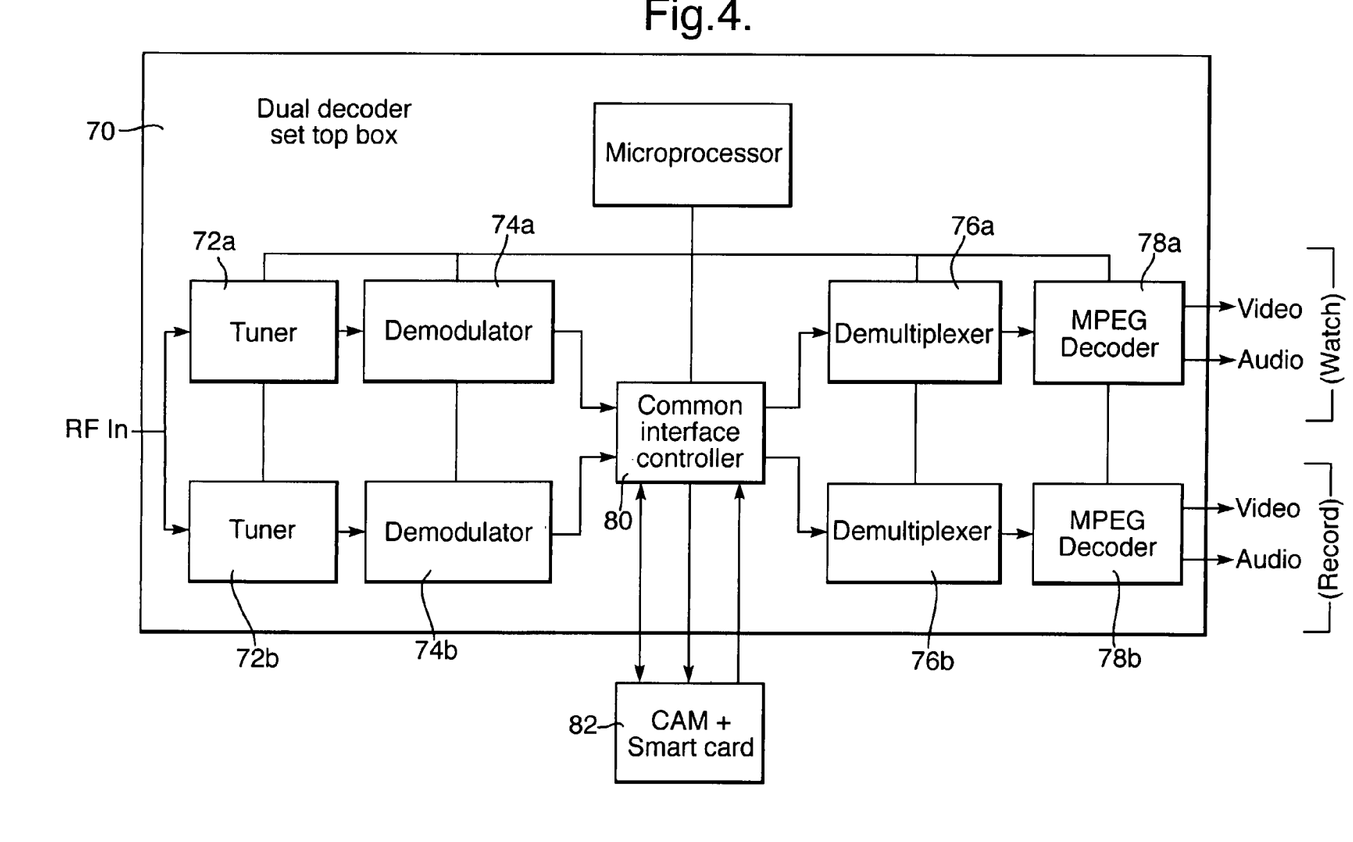
FIG. 4 illustrates schematically a digital television receiver including a common interface controller according to the present invention.

FIG. 4 illustrates schematically a digital television receiver 70 embodying the present invention.

As illustrated, two distinct paths are provided through the receiver 70 for two different channels, for instance to enable one channel to be watched whilst another channel is recorded. The first path through the device for the first channel includes a tuner 72a, a demodulator 74a, a demultiplexer 76a and an MPEG decoder 78a and, similarly, the second path through the device for the second channel includes a tuner 72b, a demodulator 74b, a demultiplexer 76b and an MPEG decoder 78a. It will be noted that both paths pass through a single common interface controller 80 which allows connection by a standard common interface to a conditional access module 82.

The arrangement and processing of the common interface controller 80 will be described in further detail below.

It will be noted that a single transport stream will typically contain 4, 5, 6 or more channels, where each channel typically consists of a combination of video, audio and possibly teletext. An example of a channel is "BBC 1".

The multiple channels plus auxiliary data such as ECMs, EMMs and Service Information (SI), are combined into a single data stream, using time division multiplexing at transport stream packet boundaries. The Packet Identifier (PID) field in each transport stream's packet header identifies the type of data in each transport stream packet, including the channel to which that particular packet belongs.

Unfortunately, two different transport streams will usually use the same PIDs for their respective channels and associated TI. Therefore, it is not possible for a conditional access module merely to process the two transport streams simultaneously. In particular, the conditional access module will use the PIDs to identify the packets of a channel to be descrambled. If two transport streams were to be provided to a conditional access module, it is likely that packets for two different channels or TI would have the same PIDs.

It is now proposed that, where necessary, the PIDs of one transport stream are temporarily changed so as to allow the two transport streams to be multiplexed together. In effect, since the packets of the required channels are then identifiable separately, the multiplexed stream becomes a new transport stream rather than a multiplexed pair of transport streams.

It may be that there are issues of bandwidth in providing all of the data of both transport streams to the conditional access module simultaneously. However, given two separate transport streams, where one contains the channel to be watched (plus several other channels) and the other contains the channel to be recorded (plus several other channels) it is possible to delete from one transport stream the channels which are not required and to insert into the gaps thus created the channel from the other transport stream which is required. The resultant hybrid or intermediate single transport stream can then be fed through a standard interface, such as a standard DVB Common Interface, to a standard conditional access module used for processing a single transport stream.

It is also noted that conditional access modules, such as DVB compliant conditional access modules, do not generally require a transport stream which is compliant to normal broadcast specifications. In particular, the conditional access module only uses a relatively small subset of the auxiliary (i.e. non audio/video) data contained within a normal broadcast transport stream. Thus, much of the auxiliary data can be missing, incomplete, inconsistent or even erroneous and the conditional access module will still accept the data stream as a transport stream and successfully descramble the data of the required channels in that transport stream.

Figure 5:
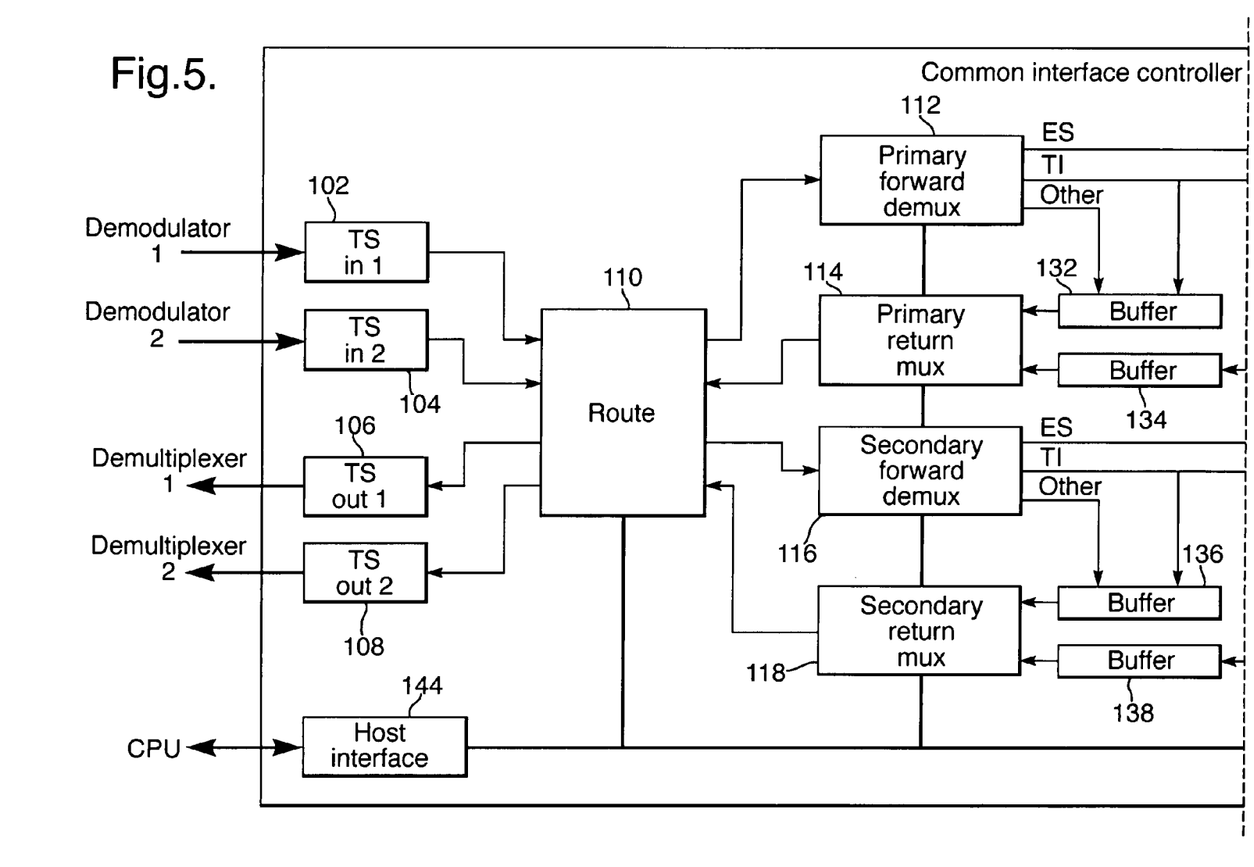
FIG. 5 illustrates schematically a common interface controller embodying the present invention.

FIG. 5 illustrates schematically a common interface controller embodying the present invention.

As illustrated, the common interface controller 100 includes a first transport stream input interface 102 and a second transport stream input interface 104 for receiving first and second transport streams from respective tuners and demodulators. These interfaces are preferably provided as flexible interfaces allowing conversion from a variety of possible demodulator transport stream output formats (for example parallel or serial) into the internal format used by the common interface controller 100.

Similarly, first and second transport stream output interfaces 106 and 108 are provided for outputting first and second transport streams (containing descrambed channels) to external demultiplexers. Again, the interfaces are preferably flexible interfaces allowing conversion from the internal transport stream format used by the common interface controller 100 into a variety of possible demultiplexer transport stream formats.

The transport stream input and output interfaces 102-108 are connected to a router 110.

The router preferably provides fully flexible transport stream routing between the transport stream input interfaces 102, 104 (and hence external demodulators) and external conditional access module and the transport stream output interfaces 106, 108 (and, hence, external demultiplexers). For example, when a conditional access module is not connected, the input from the external demodulators can be routed directly to the external demultiplexers, thereby allowing unscrambled free-to-air content to be viewed and recorded. As illustrated, the router 110 also allows routing of data between a primary forward demultiplexer 112, a primary return multiplexer 114, a secondary forward demultiplexer 116 and a secondary return multiplexer 118. It is possible for the transport stream from the first transport stream input interface 102 to be routed to either the primary forward demultiplexer 112 or the secondary forward demultiplexer 116 and, similarly, for the transport stream from the second transport stream input interface 104 to be routed to the other of the primary forward demultiplexer 112 and secondary forward demultiplexer 116. However, for simplicity of explanation, it will be assumed that the first transport stream as received by the first transport stream input interface 102 is routed to the primary forward demultiplexer 112.

The primary and secondary forward demultiplexers 112, 116 are responsible for extracting those packets of each transport stream which need to be sent to the external conditional access module, in particular, for extracting the packets of the channels required by the user. The primary and secondary forward demultiplexers 112 and 116 work by examining the PID field in each transport stream packet's header.

It will be appreciated that, given sufficient bandwidth and processing power, it may be unnecessary to use these forward demultiplexers 112, 116. In particular, the total content of both the first and second transport streams could be provided to the external conditional access module.

Where the forward demultiplexer 112 and 116 are used, three types of data can be identified for separation.

Firstly, at least a part of the transport stream containing the channel packets for descrambling must be extracted. Clearly, only packets of the required channel are needed, but, in some embodiments, there may be reasons for providing these packets along with other (possibly unnecessary) packets of other channels. This data is known as the Elementary Stream (ES) data and typically comprises the video, audio, etc which makes up the programme of the respective channel. Each of the video, audio, etc may have its own respective PID.

The primary forward demultiplexer 112 could be used to extract the channel to be watched whilst the secondary forward demultiplexer 116 could be used to extract the channel to be recorded. However, what the channels are used for is not essential to the invention. They could be used for picture-in-picture display, twin recorders etc.

The primary and secondary forward demultiplexers 112 and 116 also extract the information which the conditional access system software in the conditional access module requires in order to be able to descramble to the ES data. This data, which will be described as Table Information (TI) since it is typically carried in the form of MPEG-2 Tables, is sent to the conditional access module. It is usually sent in its own packets having its own PID value(s).

It will be appreciated that the Conditional Access Table and the Entitlement Management Messages of the Conditional Access System supported by the inserted conditional access module will typically be the same for all transport streams. Hence, it is not necessary for both the primary forward demultiplexer 112 and the secondary forward demultiplexer 116 to extract this information. In the preferred embodiment, the primary forward demultiplexer 112 extracts, as well as the required ES, the CAT and the EMMs of the CAS supported by the inserted of the conditional access module, together with the ECMs corresponding to the channel to be descrambled by the primary demultiplexer 112. The TI extracted by the secondary forward demultiplexer 116 then need only consist of the ECMs corresponding to the channel to be descrambled by the secondary forward demultiplexer 116.

Finally, it will be appreciated that all of the other data may be output from the forward demultiplexers 112 and 116 separately. This will be described further below.

As illustrated in FIG. 5, a PID remapper 120 is provided to receive the part of the second transport stream intended for the external conditional access module. In particular, as illustrated, it is provided with the Elementary Stream (ES) data and the Table Information (TI).

As mentioned above, different transport streams usually use overlapping, if not the same, PID values for different ES and TI. Hence, merely multiplexing together the channel packets of two different transport streams will usually result in different channels being identified with the same or overlapping PID values. This then makes it impossible to distinguish between the channels.

As illustrated in FIG. 5, a forward multiplexer 122 is provided to multiplex together the ES and TI parts of the first and second transport streams extracted by the primary and secondary forward demultiplexers 112 and 116. The PID remapper is arranged to change the values of PIDs of packets from the secondary forward demultiplexer 116 to values not found for the PIDs of the packets provided to the forward multiplexer 122 by the primary forward demultiplexer 112. Since the external conditional access module will be descrambling a particular channel from the second transport stream, it may be sufficient for the PID remapper merely to ensure that the values of the PIDs for that channel are not present in any of the packets provided from the first transport stream. However, if the packets of additional channels (i.e. other than the particular channel for descrambling) are provided from the second transport stream, it may also be necessary to ensure that the PIDs of these packets are not the same as the PIDs used for the channel in the first transport stream requiring descrambling.

It will be appreciated that similar considerations apply to the packets of the Table Information in the first and second transport streams. Hence, it may be necessary to remap ES packets to avoid clashes with TI packets and to remap TI packets to avoid clashes with ES or TI packets. However, the present invention could be embodied in a manner which handles TI data in a different way to the ES data.

The PID remapper 120 may selectively change the values of PIDs of packets as required. Alternatively, the PID remapper 120 can be configured to remap the values of all packet PIDs (irrespective of whether this is necessary for a particular PID) to values not used for the first transport stream.

It will be appreciated that where the PID remapper modifies the PID field in a transport stream header, then the corresponding PID field within the CA_PMT object conveyed via the command interface to the conditional access module is also modified correspondingly. This ensures that the conditional access module tracks the changes that have been made.

The forward multiplexer 122 combines the primary ES and TI data of the first transport stream with the (potentially) PID remapped secondary ES and TI data of the second transport stream into a single data stream acceptable to the conditional access module. In particular, as a result of the PID remapping, the datastream itself forms a new transport stream which will be described as an intermediate transport stream. This transport stream could also be considered as a partial transport stream, because it will not usually conform to all normal broadcast specifications.

Preferably, the intermediate transport stream has a constant data rate, even though the ES and TI data feeding it may have a variable rate. This is achieved by making the intermediate transport stream's data rate higher than the long term average data rate of combined primary and secondary ES and TI data, by queuing ES and TI data as necessary in a buffer 124 and by inserting null transport stream packet into the intermediate transport stream when no ES or TI data is available.

The output of the forward multiplexer 122 is provided to a transport stream interface 126 which may operate in a conventional manner to provide a transport stream to an external conditional access module.

In the illustrated embodiment, the transport stream interface is responsible for translating the internal transport stream format used by the common interface controller 100 into the required common interface format, such as the DVB Common Interface format.

As is well known for conditional access modules, the external conditional access module can descramble the packets of the required channels by identifying packets of those channels from the PIDs. The common interface controller includes a command interface 128 for communicating with the Conditional Access Module in a known manner.

Having descrambled the channel packets as required, the conditional access module returns the intermediate transport stream (now containing descrambled packets) and this is received by the transport stream interface 126. For the illustrated embodiment, the transport stream interface 126 then translates the format of the transport stream returned by the conditional access module into the common interface controller's internal format.

The returned intermediate transport stream is provided to a return demultiplexer 130. This is responsible for separating out the ES information into its two original data streams, for instance, by examining the PID field in each transport stream packet's header.

The return demultiplexer 130 could output all of the packets (noting that some will be descrambled) as received by the forward multiplexer 122. However, in the illustrated embodiment, for reasons which will be described further below, it outputs only the ES information. All of the TI data sent to the conditional access module is discarded at this stage. In any case, any null transport stream packets inserted by the forward multiplexer 122 will be discarded.

Considering the first transport stream, the corresponding ES information (including the descrambled channel data) is returned to the primary return multiplexer 114. This allows the primary return multiplexer to reconstruct the original first transport stream from the returned ES information and the remaining data made up of the TI and other data, but including descrambled rather than scrambled channel packets. Thus, as illustrated, other data extracted by the primary forward demultiplexer 112 is provided to the primary return multiplexer 114. Similarly, in the illustrated embodiment, the table information is provided from the primary forward demultiplexer 112 rather than via the conditional access module and return demultiplexer 130.

Buffer 132 is used to hold the TI and other data output from the primary forward demultiplexer 112, so as to compensate for the delay in sending data to and receiving data back from the conditional access module. This allows the descrambled transport stream packets to be reinserted in their original relative position within their corresponding transport streams.

Buffer 134 is used to hold the descrambled ES data at the input to the primary return multiplexer 114 so as to facilitate a data rate change between the transport stream data received from the conditional access module and the data rates of the transport streams sent to the external demultiplexers. That is, it is used to queue data until it can output to an external demultiplexer.

A similar process occurs for the ES information output from the return demultiplexer 130 for the second transport stream. However, it will be appreciated that the PID values for this ES information must be changed.

A PID demapper 140 receives from the return demultiplexer 130 the ES data of the second transport stream. The PID demapper 140 restores the original PIDs to the ES data. In other words, it reverses any changes to ES PID values made by the PID remapper 120.

The resulting ES information is provided to the secondary return multiplexer 118 and used to reconstruct the second transport stream in the same manner as was described for the first transport stream above. Similarly, the buffers 136 and 138 are provided for the Table Information, the other data and the returned descrambled ES data.

The outputs of the primary return multiplexer 114 and secondary return multiplexer 118 may then be routed by the router 110 to the first output transport stream 106 and second output transport stream interface 108 for forwarding to corresponding external demultiplexers.

Thus, channels from different transport streams may be descrambled by a conditional access module configured to receive only a single transport stream. Indeed, depending on the capability of the conditional access module, it would also be possible to combine three or more different channels from three or more transport streams into a single transport stream for descrambling by the conditional access module.

For completeness, it will be noted that a control unit 142 implements a Link Layer of the command interface, for instance as defined by DVB. The rest of the common interface protocol stack (for instance DVB) is implemented in software on the host digital television receiver's microprocessor.

The host interface 144 allows the host digital television receiver's microprocessor to control the operation of the common interface controller for example by providing to the primary and secondary forward demultiplexers 112 and 116 the PID values of the channels required by the user. The host interface 144 also provides a conduit through which common interface protocol objects (for instance DVB) are transferred between the host digital television receiver's microprocessor and the conditional access module's microprocessor.

We claim:

1. A common interface controller for use in a digital television device having a connector for a selectively attachable conditional access module for descrambling channels of a transport stream as identified by respective PIDs, the common interface controller including:
    a first input interface for a first transport stream having a first channel identifiable by one or more first PIDs;
    a conditional access interface configured to transmit to the conditional access module transport streams having scrambled channels and receive from the conditional access module transport streams having descrambled channels;
    a second input interface for a second transport stream having a second channel identifiable by one or more second PIDs;
    a forward multiplexer configured to provide an intermediate data stream by time multiplexing at least part of the first transport stream with at least part of the second transport stream, the at least part of the first transport stream including the first channel and the at least part of the second transport stream including the second channel;
    a PID remapper configured to change the original values of the second PIDs to intermediate values not used by any PID of said at least part of the first transport stream such that said intermediate data stream forms an intermediate transport stream, the conditional access interface being arranged to transmit the intermediate transport stream to a conditional access module configured to descramble at least the first channel and the second channel;
    a return demultiplexer configured to receive from the conditional access interface the intermediate transport stream descrambled by the conditional access module and separate said at least part of the first transport stream from said at least part of the second transport stream; and
    a PID demapper configured to change the intermediate values of the one or more second PIDs, as received by the conditional access interface from the conditional access module, back to their original values.

2. A common interface controller according to claim 1 wherein:
    the PID remapper is arranged to change the original values of each PID of the channels in said at least part of the second transport stream to respective intermediate values not used by any PID of said at least part of the first transport stream.

3. A common interface controller according to claim 1 wherein:
    the PID demapper is arranged to change the intermediate values of each PID of the channels in said at least part of the second transport stream, as received by the conditional access interface from the conditional access module, back to the respective original values.

4. A common interface controller according to claim 1 further including:
    a secondary return multiplexer configured to receive from the return demultiplexer said at least part of the second transport stream, as changed by the PID demapper, and multiplex at least a part of the received at least part of the second transport stream with the remaining data of the second transport stream so as to output the second transport stream having the second channel descrambled.

5. A common interface controller according to claim 4 further including:
    a secondary buffer configured to store at least those parts of the second transport stream not forming said at least part of the second transport stream and for use by the secondary return multiplexer.

6. A common interface controller according to claim 5 wherein:
    said at least part of the second transport stream includes Table Information for the second transport stream and the secondary buffer is arranged to store the Table Information for use by the secondary return multiplexer.

7. A common interface controller according to claim 1 further including:
    a primary return multiplexer configured to receive from the return demultiplexer said at least part of the first transport stream and multiplex the received at least part of the first transport stream with the remaining data of the first transport stream so as to output the first transport stream having the first channel descrambled.

8. A common interface controller according to claim 7 further including:
a primary buffer configured to store at least those parts of the first transport stream not forming at least a part of the first transport stream and for use by the primary return demultiplexer.

9. A common interface controller according to claim 8 wherein:
said at least part of the first transport stream includes the Table Information for the first transport stream and the primary buffer is arranged to store the Table Information for use by the primary return multiplexer.

10. A common interface controller according to claim 1 further including:
a primary forward demultiplexer configured to receive the first transport stream from the first input interface, separate from the first transport stream said at least part of the first transport streams, and output said at least part of the first transport stream to the forward multiplexer.

11. A common interface controller according to claim 1 further including:
a secondary forward demultiplexer configured to receive the second transport stream from the second input interface, separate from the second transport stream said at least part of the second transport streams and output said at least part of the second transport stream.

12. A common interface controller according to claim 11 wherein:
the PID remapper is connected between the secondary forward demultiplexer and the forward multiplexer.

13. A common interface controller according to claim 1 further including:
a command interface configured to communicate with the conditional access module.

14. A digital television device comprising:
a connecter for a selectively attachable conditional access module configured to descramble channels of a transport stream as identified by respective PIDs; and
a common interface controller including
a first input interface for a first transport stream having a first channel identifiable by one or more first PIDs,
a conditional access interface configured to transmit to the conditional access module transport Streams having scrambled channels and receive from the conditional access module transport streams having descrambled channels,
a second input interface for a second transport stream having a second channel identifiable by one or more second PIDs,
a forward multiplexer configured to provide an intermediate data stream by time multiplexing at least part of the first transport stream with at least part of the second transport stream, the at least part of the first transport stream including the first channel and the at least part of the second transport stream including the second channel,
a PID remapper configured to change the original values of the second PIDs to intermediate values not used by any PID of said at least part of the first transport stream such that said intermediate data stream forms an intermediate transport stream, the conditional access interface being arranged to transmit the intermediate transport stream to the conditional access module configured to descramble at least the first channel and the second channel,
a return demultiplexer configured to receive from the conditional access interface the intermediate transport stream descrambled by the conditional access module and configured to separate said at least part of the first transport stream from said at least part of the second transport stream, and
a PID demapper configured to change the intermediate values of the one or more second PIDs, as received by the conditional access interface from the conditional access module, back to their original values.

15. A digital television device according to claim 14 wherein the device is one of a digital television receiver, a digital TV tuner board for a personal computer and a Personal Video Recorder.

16. A digital television device according to claim 14 in combination with one or more conditional access modules selectively attachable to said connector.

17. A method of descrambling channels of first and second transport streams using a conditional access module for descrambling channels of a transport stream as identified by respective PIDs, the method including:
providing an intermediate data stream by time multiplexing at least part of the first transport stream with at least part of the second transport stream, the at least part of the first transport stream including a first channel and the at least part of the second transport stream including a second channel;
changing the original value of one or more PIDs identifying the second channel to an intermediate value not used by any PID of said at least part of the first transport stream such that the intermediate data stream forms an intermediate transport stream for processing by the conditional access module;
receiving the intermediate transport stream descrambled by the conditional access module and separating said at least part of the first transport stream from said at least part of the second transport stream; and
changing the intermediate values of the one or more second PIDs, as received from the conditional access module, back to their original values.

18. A common interface controller for use in a digital television device having a connector for a selectively attachable conditional access module for descrambling channels of a transport stream as identified by respective PIDs, the common interface controller including:
a first input interface for a first transport stream having a first channel identifiable by one or more first PIDs;
a conditional access interface configured to transmit to the conditional access module transport streams having scrambled channels and receive from the conditional access module transport streams having descrambled channels;
a second input interface for a second transport stream having a second channel identifiable by one or more second PIDs;
a forward multiplexer configured to provide an intermediate data stream by time multiplexing at least part of the first transport stream with at least part of the second transport stream, the at least part of the first transport stream including the first channel and the at least part of the second transport stream including the second channel;
a PID remapper configured to change the original values of the second PIDs to intermediate values not used by any PID of said at least part of the first transport stream such that said intermediate data stream forms an intermediate transport stream, the conditional access interface being arranged to transmit the intermediate transport stream to a conditional access module configured to descramble at least the first channel and the second channel; and a primary forward demultiplexer configured to receive the first transport stream from the first input interface, separate from the first transport stream said at least part of the first transport stream, and output said at least part of the first transport stream to the forward multiplexer; and a PID demapper configured to change the intermediate values of the one or more second PIDs, as received by the conditional access interface from the conditional access module, back to their original values.

* * * * *